United States Patent [19]
Utsumi et al.

[11] 3,761,168
[45] Sept. 25, 1973

[54] MOTION PICTURE DISPLAY SPEED SHIFTING DEVICE

[75] Inventors: Jihachiro Utsumi, Yokohama; Takesaburo Shibuki, Ageo-shi, Saitama, both of Japan

[73] Assignee: Bell Ko-On Co., Ltd., Tokyo, Japan

[22] Filed: Feb. 2, 1972

[21] Appl. No.: 222,959

[30] Foreign Application Priority Data
June 2, 1971 Japan.................... 46/38418

[52] U.S. Cl............................. 352/168, 352/194
[51] Int. Cl.............................................. G03b 1/22
[58] Field of Search.................... 352/84, 168, 194, 352/196; 226/70

[56] References Cited
UNITED STATES PATENTS
3,600,074 8/1971 Ueno.................... 352/194
2,173,230 9/1939 Kellogg.................... 352/194 X Primary Examiner—Samuel S. Matthews
Assistant Examiner—Michael L. Gellner
Attorney—Frank J. Jordan

[57] ABSTRACT

A motion picture display speed shifting device includes a rockable arm having a film perforation engaging claw and a follower element. Cams are provided to engage the follower element and pivot the arm in a plurality of directions whereby the arm is actuated to cause the claw thereon to engage and disengage the perforation of the motion picture film and thereby move the motion picture film past a projector aperture. Biasing means are provided to selectively bias the follower element into engagement with either one of two rotary cam wheels to thereby vary the motion picture feed speed.

11 Claims, 7 Drawing Figures

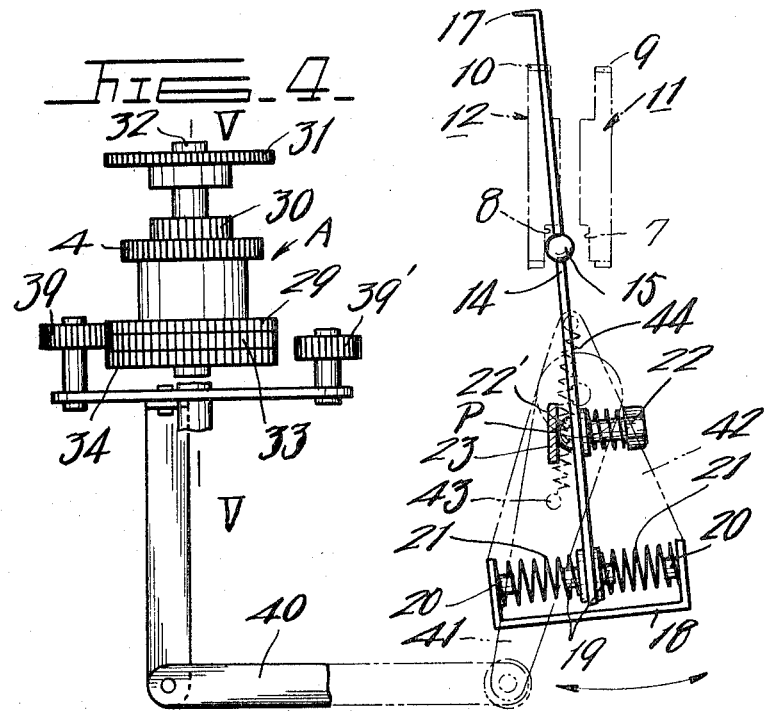
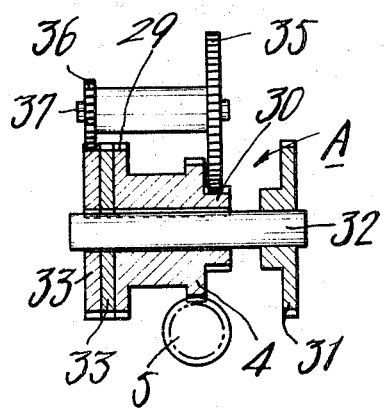
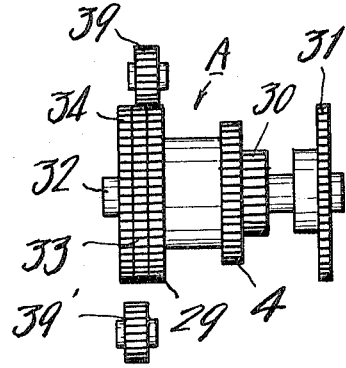

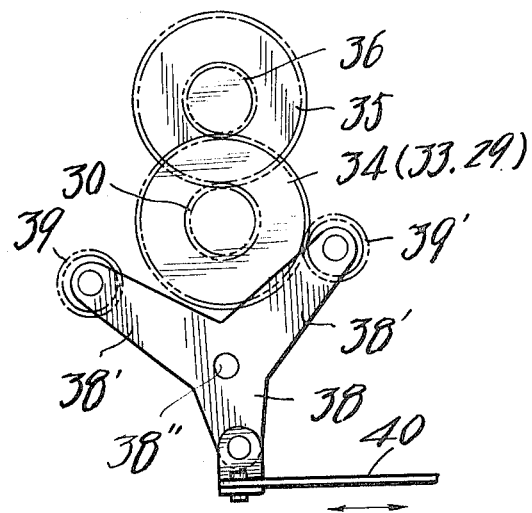

MOTION PICTURE DISPLAY SPEED SHIFTING DEVICE

BACKGROUND OF THE INVENTION

This invention relates to motion picture projectors and more particularly, to motion picture display speed shifting devices to be employed in conjunction with motion picture film feed sprocket wheels in such projectors.

In the operation of a motion picture projector, it is very often desired to change the feed speed of a film on which images to be displayed are recorded, either speed up or slow down the display motion of the images on the film. There have been proposed a number of motion picture display speed shifting devices hithertofore and in a typical conventional motion picture display speed shifting device, the operation of a film feed claw is effected by means of the action of a triangular cam which periodically moves in a predetermined frequency set for normal display motion such as sixteen - eighteen frames of a motion picture film per second, for example and of the action of a plane cam assembly which moves the film feed claw into and out of the path of the film. The plane cam assembly comprises plural groups of plane cams provided on one side of a common wheel having different axes wherein the plane cams in each group are coaxial the common axis of cams in each group is offset from those of the cams in the other groups and by selectively employing the plane cam groups, the fulcrum about which the film feed claw moves into and out of the film path is displaced as desired and the claw is imparted thereto an intermittent motion so as to advance the film past the projector aperture. However, since the film is advanced only by the intermittent movement of the claw, the film is subjected to a substantial amount of stress. Furthermore, since the triangle cam is employed for moving the claw, adverse light flicker is liable to occur unless the width of the shutter in the projector is made relatively wide and the feed of the film is unstable. In order to eliminate the light flicker, it has been proposed to decelerate the shutter shaft and/or to increase the number of the vanes on the shutter in the projector. Furthermore, the deceleration of the sprocket has been conventionally effected by the employment of a gear train in which the component gears are at all the times in engagement with each other. However, the former attempt renders displaed images obscure whereas the latter inevitably complicates the construction of the projector.

SUMMARY OF THE INVENTION

Therefore, this invention provides a novel and improved motion picture display speed shifting device to be employed in conjunction with a film feed sprocket wheel in a motion picture projector which can effectively eliminate the disadvantages inherent in the prior art like devices and in which the shifting of film feed speed from the speed for normal motion display to that for slow motion display and vice versa and deceleration or acceleration of the sprocket wheel in the motion picture projector can be simultaneously effected with a quite simplerconstruction and a higher certainty.

One principal object of the present invention is to provide a device which can produce slow motion display effects by shifting a drive mechanism for a film perforation engaging claw which intermittently moves a motion picture film past a motion picture projector without stopping the operation of the drive mechanism.

For producing slow motion display effects, it has been conventionally practiced that a motion picture camera takes a motion picture on a motion picture film to record images thereon at a speed two – four times as high as the normal or standard motion picture taking speed and a displays the images recorded on the film in the normal or standard display motion. However, when non-proffessional persons desire to display slow motion pictures, the slow motion display by such persons have been in most cases impracticable because of economical limitations and/or the performance of motion picture cameras available to such persons.

And therefore, one object of the present invention is to provide a simple and economical motion picture projector which can produce slow motion display effects in a quite simple and economical manner.

According to the present invention, a novel and improved motion picture display speed shifting device whereby a motion picture feed speed can be intermittently varied by shifting a film perforation engaging claw from one position to another for slow motion display. Since it has been well known in the art that light flicker objectional to the eye occurs very frequently by means of mere deceleration of display speed, according to the present invention, for the slow motion display purpose, only a motion picture film is fed at a sloweddown speed without varying the rotation speed of a shutter. Feed speed of the film by a sprocket wheel is decelerated in synchronism with the deceleration of the film perforation engaging claw by shifting the drive speed of the sprocket to a reduced one simultaneously when the drive speed of the claw is shifted to a reduced one.

According to the present invention, there is provided a motion picture display speed shifting device to be employed in conjunction with a sprocket wheel in a motion picture projector which comprises a shutter having an integral shutter pulley on one side and fixedly mounted at one end of a shutter shaft, a spiral cam wheel fixedly mounted on said shaft adjacent to and inwardly of said pulley, a pair of opposite and spaced rotary wheels freely mounted on said shaft on the opposite sides of said cam wheel and having different numbers of convexed and concaved cam faces on the inner sides thereof, respectively, a gear fixedly mounted at a point adjacent to the other end of said shaft, and a gear train in engagement with said gear and rotary wheels for driving the wheels, an operation arm disposed between said opposite rotary wheels and having a film perforation engaging claw, said operation arm being adapted to be reciprocally rocked vertically and laterally by means of said cam wheel and rotary wheels whereby said claw is actuated to move a motion picture film past a projector aperture and to engage and disengage from perforations in said film.

The above and other objects and attendant advantages of the present invention will be more readily apparent to those skilled in the art from a reading of the following description referring to the accompanying drawings which illustrate one preferred embodiment of the invention for illustration purpose only, but not for limiting the scope of the same in any way.

BRIEF DESCRIPTION OF THE DRAWINGS

The accompanying drawings show one preferred form of motion picture display speed shifting device for motion picture projectors constructed in accordance with the present invention in which;

FIG.4 is a plan view showing the interrelationship between shifting in an operation arm and a clutch mechanism ;

FIG.5 is a side elevational view in section of a portion of said clutch mechanism shown in FIG.4 taken substantially along the lin V—V therein;

FIG.6 is a plan view of FIG.5 ; and

FIG.7 is a fragmentary view which shows shifting in said clutch mechanism.

PREFERRED EMBODIMENT OF THE INVENTION

Figure 1:
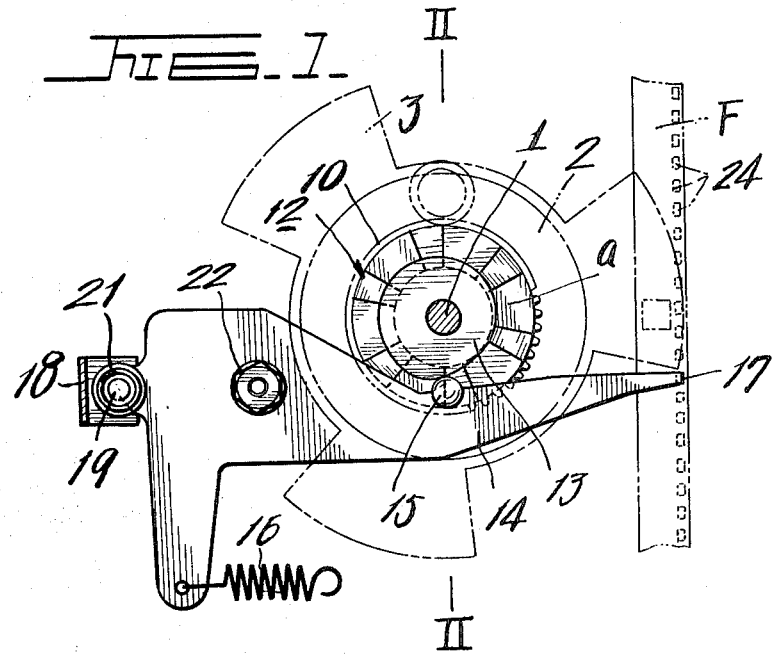
FIG.1 is a front elevational view of essential parts of said motion picture display speed shifting device in artial section.
Figure 2:
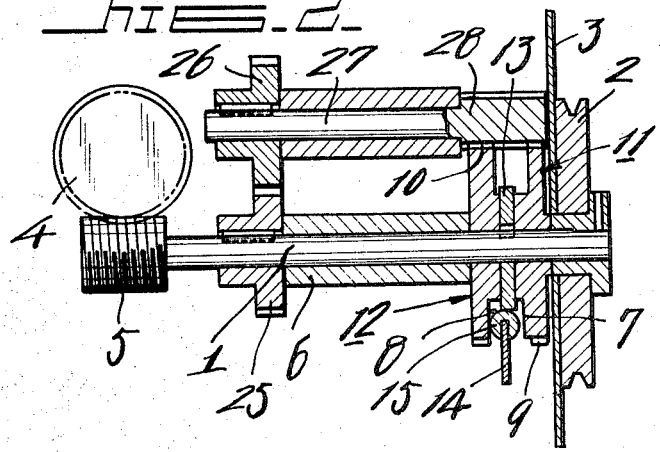
FIG.2 is a longitudinally sectional view taken substantially along the line II — II of FIG.1.
Figure 3:
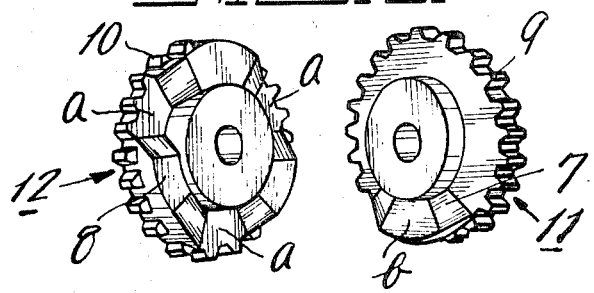
FIG.3 is a fragmentary perspective view of rotary wheels having plane cams integrally therewith in an exploded condition in order to illustrate details of the construction of the plane cams formed with said rotary wheels.

The present invention will be now described referring to the accompanying drawings in which one preferred embodiment of the invention is shown for illustration purpose. Reference numeral 1 denotes a shutter shaft which has at one end (the right-hand end as seen in FIG.2) a shutter 3 secured thereto which shutter has an integral shutter pulley 2 on one side. The other end of the shutter shaft 1 fixedly mounts a worm 5 which is in engagement with a free worm wheel 4 which transmits movement from the shutter shaft to and forms a part of a clutch mechanism A of which description will be made hereinbelow. The shutter shaft 1 itself is journalled in a bearing member 6 which is in turn suitably supported in the machine frame (not shown). The shutter shaft 1 freely mounts a pair of opposite and spaced rotary wheels 11 and 12 thereon on the side of the shutter 3 opposite to the shutter pulley 2 and the wheels have integral plane cams 7 and 8 on the opposite inner sides and teeth 9 and 10 in the outer periphery, respectively. The plane cams 7 and 8 have different numbers of concaved and convexed cam faces on their opposite inner sides (in the illustrated embodiment, the cam 7 has only one convexed cam face $b$ whereas the cam 8 has three equally spaced concaved cam faces $a$ ). A cam wheel 13 having a spiral contour in the outer periphery is fixedly mounted on the shutter shaft 1 between the rotary wheels 11 and 12. The shutter shaft 1 is rotated by a motor (not shown) through an endless member (not shown) which is trained over the shutter pulley 2 and the output shaft of the motor (not shown).

The spiral contour outer periphery of the cam wheel 13 is abutted by a spherical contacting member 15 provided between the opposite ends of an operation arm 14 of which description will be made in detail hereinafter and the contacting member is at all the times urged against the cam wheel 13 by means of a spring 16 which has one end secured to one end of the operation arm 14 whereby the operation arm is actuated by the cam wheel 13 when the shaft 1 on which the cam wheel is mounted is rotated. The operation arm 14 has a substantially L-shaped configuration and is positioned between the cams 7 and 8. The L-shaped operation arm 14 has at one end of its longer leg portion a film perforation engaging claw 17 and the above-mentioned spring 16 is anchored to one end of its shorter leg portion. The other end of the arm longer leg portion has a short extension which has a pair of oppositely extending projections 19 and 19 on the opposite sides thereof and which is received in a substantially U-shaped section shiftable frame member 18 which is also provided with a pair of projections 20 and 20 on the inner sides of the opposite leg portions of the frame member. The projections 20 extend toward and terminate short of the respectively opposite projections 19 on the extension of the arm longer leg portion. A compression spring 21 is positioned between the respectively associated and opposite projections 19 and 20 with the opposite ends of the spring anchored to the projections.

The operation arm 14 further has a pin 22 which selectively abuts against the cams 7 and 8 and extend through the arm at a midpoint between the abutment member 15 and projections 19 and the pin provides a fulcrum P of the operation arm 14 in cooperation with a member to be described hereinbelow (the position of the fulcrum is determined by the distance range within which the claw 17 moves ). An abutment member 23 is suitably provided in the machine frame adjacent to the semi-spherical head 22' of the pin 22 for engaging and disengaging from the pin and provides the fulcrum P in cooperation with the pin. In this way, as the operation arm 14 rocks about the fulcrum P, the film perforation engaging claw 17 on the operation arm periodically engages the perforations 24 in a continuous film F and moves the film past the projector aperture (not shown) in intermittent motion. The shutter shaft 1 further fixedly mounts thereon a gear 25 adjacent to and inwardly of the worm 5 and the gear engages a mating gear 26 which is in turn fixedly mounted at one end of a shaft 27 which extends parallel to and spaced from the shutter shaft 1. The shaft 27 further fixedly mounts at the other end a gear 28 which engages the rotary wheels 11 and 12 on the shutter shaft whereby in operation, the rotation of the shutter 3 is transferred through the shutter shaft 1, gears 25,26 and 28 to the rotary wheels 11 and 12 which in turn cause the contacting member 15 on the operation arm 14 to selectively contact the plane cams 7 or 8 which in turn causes the operation arm to move laterally about the fulcrum P. Since the contacting member 15 engages the rotary wheel 13, the lateral movement of the operation arm 14 rotates the rotary wheel 13 on the shutter shaft 1 which in turn rocks the operation arm 14 vertically about the fulcrum P. Thus, the film perforation engaging claw 17 on the arm 14 is intermittently moved in both lateral and vertical directions whereby the claw moves the film F past the projector aperture.

Now description will be made of details of the construction and operation of the clutch mechanism A assuming that the film F is being fed in the projector.

The shifting clutch mechanism is driven by the worm wheel 4 which is in engagement with the worm 5 fixedly mounted on the shutter shaft 1 at the other end thereof. The worm wheel 4 is integrally formed with a double gearing including a larger gear 29 and a smaller gear 30 and freely mounted on a shaft 32 which has a drive gear 31 fixedly mounted at one end. The drive gear 31 drives a film feed mechanism (not shown) through a film feed sprocket wheel (not shown) and a gear train ( not shown). The shaft 32 further has a fixed gear 33 which has the same diameter as the larger gear 29 of the double gearing and is positioned adjacent to the latter gear and a free gear 34 on the side of the gear 33 opposite to the gear 29. The gear 34 has the same diameter as the gears 29 and 33. The gear 34 engages a smaller gear 36 mounted at one end of a shaft 37 parallel to the shaft 32 and the parallel shaft 37 also mounts at the other end a larger gear 35 which engages the smaller gear 30 of the double gearing. With the arrangement of the gears, the rotation of the worm gear 4 is on one hand transferred through the larger gear 29 to the fixed gear 33 and on the other hand through the smaller gear 30, larger gear 35, smaller gear 36 and larger gear 34 to the fixed gear 33.

For the transfer of movement to the fixed gear 33 and larger gears 29 and 34, a substantially Y-shaped operation member 38 is suitably pivotally supported by means of a pivot pin on an upright support piece which is in turn secured to one end of a linkage 40 which is connected the shiftable frame member 18 and the outwardly diverged opposite arms 38' and 38' of the operation member 38 are positioned adjacent to the peripheries of the fixed gear 34 and larger gears 29 and 34 in diametrical opposite positions. The opposite arms 38' journal at their free ends pinions 39 and 39' having the same diameter, respectively. The pinion 39 is adapted to engage the fixed gear 33 and the larger gear 29 freely mounted of the double gearing whereas the other pinion 39' is adapted to engage the fixed gear 33 and larger gear 34. The engagement of the pinion 39 or 39' with the associated gears enable the gear train to vary gear speed. As the operation member 38 is pivoted in one or the other direction about its fulcrum 38" as the shiftable frame 18 is shifted from one position to the other position, the pinion 39 or 39' engages the associated gears.

The shiftable frame member 18 has an integral rocking piece 42 to which one end of a link arm 41 is pivoted at an intermediate point between the opposite ends of the rocking piece 42 and the other end of the link arm is pivoted to the linkage 40 at the other end thereof. The operation arm 41 has a pin 43 extending outwardly of one side of the arm and an overcenter spring 44 is anchored at one end to the pin 43 whereas the other end of the spring is anchored to the rocking piece 42 at one end thereof. When the link arm 41 is pivoted as the shiftable frame member 18 is shifted, if the link arm is pivoted over the dead point of the spring 44 in either direction, the action of the spring 43 momentarily shifts the shiftable frame member 18 in the direction in which the spring acts. Such shifting of the shiftable frame member 18 shifts the linkage 40 connected to the shiftable frame member 18 through the link arm 41 which in turn pivots the Y-shaped operation member 38 resulting in shifting of the clutch mechanism A.

With the above construction and arrangement of the clutch mechanism A, in the display operation of the movie projector in which the motion picture display speed shifting device of the invention is incorporated, the continuous motion picture film F is moved past a film gate of the projector (not shown) by the film feed mechanism for motion picture display in the normal or standard motion, when driven by the drive motor (not shown), the shutter shaft 1 rocks the operation arm 14 vertically by means of the spiral cam wheel 13 about the fulcrum P. As the operation arm 14 rocks in the manner mentioned above, the contacting member 15 on the arm 14 contacts the normal motion display plane cam 8 which is positioned on the right-hand side of the wheel 13 (as seen in FIG.2). Upon being contacted by the contacting member 15, the plane cam 8 causes the operation arm 14 to pivot laterally about the fulcrum P whereby the cooperating cam wheel 13 and operation arm 14 cause the film perforation engaging claw 17 on the operation arm to engage in the perforations 24 in the film F so as to move the film past the projector aperture for normal motion display in cooperation with the film feed sprocket wheel.

When the projector is operated for slow motion display, the operation arm 14 is so shifted that the contacting member 15 on the arm may contact the other or slow motion display cam 7 by shifting the shiftable frame member 18 and by the cooperative action between the cam wheel 13, plane cam 7 and operation arm 14, the claw 17 can engage the perforations 24 in the film F to move the film past the projector aperture in the same manner as described in connection with the operation of the projector for normal speed motion diplay, but since the plane cam 7 has only one convexed cam face b thereon and only when the contacting member 15 contacts this cam face b, the claw 17 can engage the film perforations 24 and can not engage the perforation when the contacting member contact the rest area other than the cam face and as a result, the feed speed of the film F is reduced to one third that as in the case of normal speed motion display.

In order to transfer movement to the film F from the sprocket wheel for normal motion display, the rotational movement of the motor driven shutter shaft 1 is transferred through the worm gear 5 on the shaft to the engaging worm gear 4 which then transfers the movement to the shaft 32. The rotation of the shaft 32 is caused by the rotation of the larger gear 29 of the double gearing freely mounted on the shaft and in now engagement with the pinion 39. The pinion 39 then transfers the rotational movement to the gear 33 fixed on the shaft 32 and the gear 33 drives the sprocket wheel by means of the gear train which sprocket wheel engages the perforations 24 in the film F to move the latter.

On the other hand, in order to transfer movement to the film F from the sprocket wheel for slow motion display, the operation arm 14 is shifted from the position for normal motion display in which the contacting member 15 on the arm is in contact with the normal motion display cam 8 to the slow motion display position in which the contacting member 15 contacts the slow motion display cam 7 and at the same time, the pinion 39 which is now in engagement with the fixed gear 33 is disengaged from the gear whereas the other pinion 39' which is now is disengaged from the associated gears is moved into engagement with the larger gear 34 freely mounted on the shaft 32 and the fixed gear 33 on the common shaft by pivoting the Y-shaped operation member 38 about the fulcrum 38" by the shift linkage link 40. Thus, the rotational movement is transferred from the smaller gear 30 of the double gearing integral with the gear 4 and freely mounted on the shaft 32 together with the gear 4 through the larger and smaller gears 35 and 36 of the double gearing mounted on the shaft 37. The gears 35 and 36 are in respective engagement with the gears 30 and 34, the latter gear 34 being in engagement with the smaller gear 36 and freely mounted on the shaft 32. The rotation of the gear 34 in turn rotates the fixed gear 33 on the shaft 32 through the pinion 39' and the rotational movement of the gear 33 is transferred through the gear train to the sprocket wheel which in turn feeds the film for slow motion display. The rotational movement speed imparted to the sprocket wheel has been reduced to the value set for the slow motion display as the rotational movement is transferred in the manner as mentioned just above.

To describe further in detail, in a cycle of slow motion display operation of the projector, the vertically reciprocal movement of the operation arm 14 is continuously effected in the normal or standard frequency whereas the laterally reciprocal movement of the arm which is imparted thereto by the slow motion display cam 7 is intermittently effected. When the vertical and lateral movement of the operation arm 14 are synchronized with each other or the contacting member 15 on the operation arm 14 acts on the cam face b on the slow motion display cam 7, the claw 17 moves to the film F to engage one of the perforations 24 in the film and advances the film past the projector aperture by one frame and then moves away from the film. In the next cycle, since the contacting member 15 clears the cam face b and as a consequence, the claw 17 can not move to contact the film F, the claw is allowed to reciprocally move only in the vertical direction.

As mentioned hereinbefore, the shutter shaft 1 is rotated from the motor through the endless member (not shown) trained over the output shaft of the motor (not shown) and the shutter pulley 2 and shifting from normal motion dispay to slow motion display and vice versa can be simply and conveniently by means of the arrangement of the spriral cam wheel 13 fixedly mounted on the shutter shaft and plane cams 7 and 8 disposed on the opposite sides of the cam wheel 13.

While there has been described what are at present considered to be the preferred embodiment of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A motion picture display speed shifting device comprising a rockable arm having a film perforation engaging claw and a follower element, first pivotal means mounting said arm for pivotal movement in a first plane in which said claw rocks back and forth to move said motion picture film past a projector aperture, second pivotal means mounting said arm for pivotal movement in a lateral direction relative to said first plane to move said claw into and out of engagement with the perforations of said motion picture film, first arm means engaging said follower element for pivotally rocking said arm in said first plane, second cam means engaging said follower element for pivoting said arm in said lateral direction, said first cam means comprising a first cam wheel having a cam surface on the periphery thereof, said second cam means comprising a pair of rotary cam wheels coaxial with said first cam wheel and disposed on opposite sides of said first cam wheel, said rotary cam wheels each having cam faces on the side thereof facing said first cam wheel, first means biasing said follower element into engagement with said first cam wheel as the latter is rotated, and second biasing means operable to selectively bias said follower element into engagement with the cam surfaces on either one of said rotary cam wheels as the latter are rotated, whereby said follower element is simultaneously actuated by said cam surfaces on said first cam means and by the cam surfaces on either of said rotary cam wheels of said second cam means to simultaneously pivot said arm about said first and second pivotal means.

2. A motion picture display speed shifting device according to claim 1 wherein said cam follower element is disposed on said arm at a location intermediate said engaging claw and said first and second pivotal means, said second pivotal means being disposed on said arm at a location intermediate said cam follower element and said first pivotal means.

3. A motion picture display speed shifting device according to claim 1 wherein said cam follower element has a spherical configuration to thereby adapt said cam follower element for simultaneous engagement by said first and second cam means.

4. A motion picture display speed shifting device according to claim 1 wherein said first cam wheel and said pair of rotary cam wheels are carried on a common shaft, said first cam wheel being fixedly mounted on said shaft and said pair of rotary cam wheels being freely rotatable on said shaft; and gear means between said common shaft and said pair of rotary cam wheels whereby the latter are driven off of said common shaft.

5. A motion picture display speed shifting device according to claim 1 to be employed in conjunction with a film feed sprocket wheel in a motion picture projector which comprises a shutter having an integral shutter pulley on one side and fixedly mounted on one end of a shutter shaft, said first cam wheel being mounted on said shaft adjacent to and inwardly of said pulley, a gear fixedly mounted on the other end of said shaft, and a gear train in engagement with said gear for driving said shaft.

6. A motion picture display speed shifting device according to claim 1 wherein said cam faces are convexed and concaved surfaces formed as integral plane cams on the side of said rotary cam wheels facing said first cam wheel.

7. A motion picture display speed shifting device according to claim 6 in which said plane cam associated with one of said rotary cam wheels has three equally spaced concaved cam faces on the inner side and said plane cam associated with the other rotary cam wheel has one convexed cam face on the inner side.

8. A motion picture display speed shifting device according to claim 7 in which said plane cam having three equally spaced concaved cam faces is a normal speed motion picture display cam and said plane cam having one convexed cam face is a slow motion picture display cam.

9. A motion picture display speed shifting device according to claim 1 further comprising a drive gear for driving a film feed mechanism, and operable means interposed between said rockable arm and said drive gear for driving the latter at different rotatable speeds depending on the selected position of said rockable arm as to which of the rotary cam wheels is engaging and operating said rockable arm.

10. A motion picture display speed shifting device according to claim 9 wherein said first cam wheel and said pair of rotary cam wheels are carried on a first shaft, a first gear means fixedly mounted on said first shaft, second gear means freely mounted on a second shaft and having integral first, second and third gear elements, said first gear element engaging said first gear means on said first shaft, two adjacent gears carried on said second shaft, one of said adjacent gears being freely mounted on the shaft and the other being fixedly mounted on the shaft, third gear means carried on a third shaft parallel to said second shaft, said third gear means providing a driving connection between said second gear element of said second gear means and said one adjacent gear which is freely mounted on said second shaft, and a pair of pinions operable to selectively engage said fixedly mounted adjacent gear on said second shaft either with said one adjacent gear which is freely mounted on said second shaft or with said third gear element on said second gear means whereby said second shaft is driven at different rotational speeds, said drive gear for driving said film feed mechanism being mounted on said second shaft.

11. A motion picture display speed device according to claim 10 wherein said pair of pinions are mounted on a yoke element, means mounting said yoke element for pivotal movement to provide said selective engagement, and linkage means between said yoke element and said rockable arm whereby said yoke element and rockable arm are interconnected for simultaneous selective operation.

\* \* \* \* \*